INVENTOR.
BY FRANK H. GRINNELL
CARL A. SEARS
ATTORNEYS

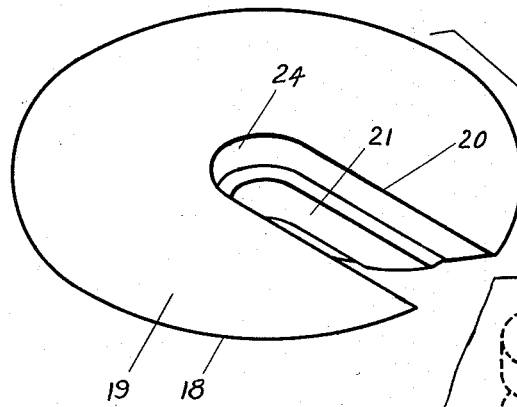
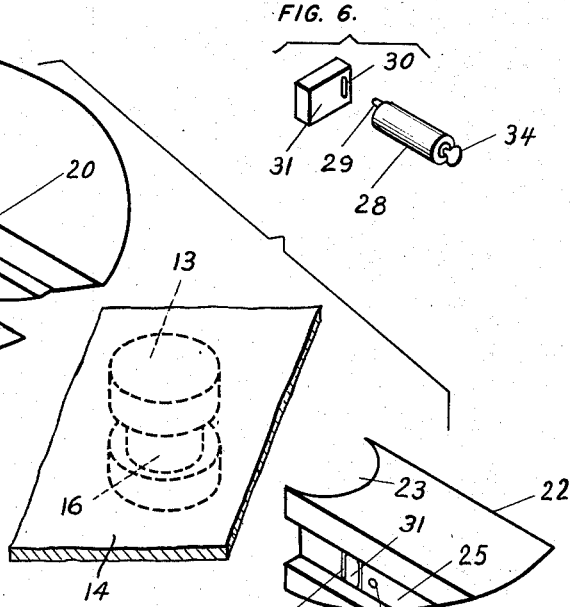
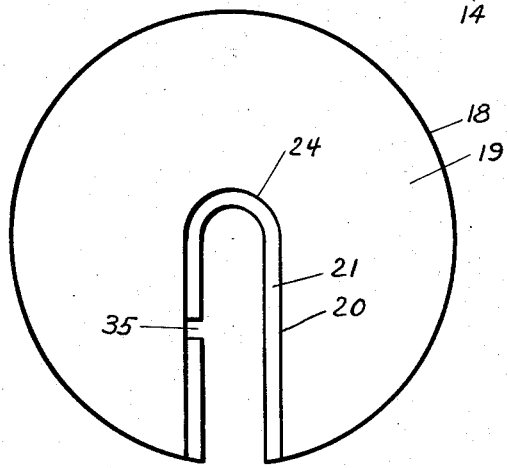
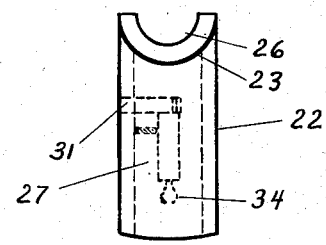
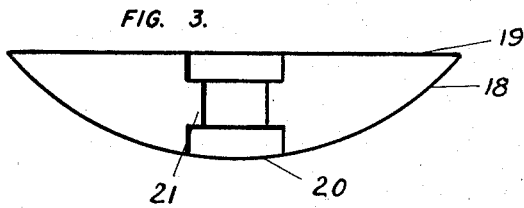
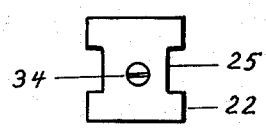
INVENTOR.
FRANK H. GRINNELL
BY CARL A. SEARS
ATTORNEYS May 4, 1948.　　F. H. GRINNELL ET AL　　2,440,744
UPPER FIFTH WHEEL KING PIN LOCK
Filed June 5, 1946　　　2 Sheets-Sheet 2

Patented May 4, 1948

2,440,744

UNITED STATES PATENT OFFICE 2,440,744

UPPER FIFTH WHEEL KINGPIN LOCK

Frank H. Grinnell, Cambridge, and Carl A. Sears, East Weymouth, Mass.

Application June 5, 1946, Serial No. 674,619

6 Claims. (Cl. 70—232)

Our present invention relates to locks for the king pin of the upper fifth wheel plate of a trailer to prevent its locking engagement within the jaws of the fifth wheel of a tractor.

Because trailers, even when loaded are commonly left unattended and in a position to be picked up by a tractor, thefts of loaded trailers have become quite frequent. As it takes but a short time to back a tractor under a trailer to bring the fifth wheel into such relation to the upper fifth wheel plate that the tractor and trailer may be operatively interconnected by locking the king pin in place, the theft of a trailer is not difficult. As the stolen trailer may then be quickly driven away, its contents removed, and the trailer dropped, the criminals are able to avoid apprehension so long as there is no delay in their pickup of the loaded trailer.

Our invention is directed to locks for the king pins on the upper fifth wheel plate as it is that type of fifth wheel that is most widely accepted, and, at the same time, the most difficult to safeguard when the trailer is disconnected from the tractor. Such king pins have an annular groove which receives the locking means on the fifth wheel by which the upper fifth wheel and the fifth wheel are pivotally interconnected. Our lock consists of first and second sections adapted to be assembled about the king pin and locked together thereon to establish a body of such size and shape as to make impossible an operative connection between the tractor and the trailer when the fifth wheel engages the lock body as the tractor is backed under the trailer. When an unlawful attempt is made to pick up a trailer, the king pin of which is thus locked, the king pin is so covered that it cannot enter between the jaws of the fifth wheel and, as a result, the lock either rides over the fifth wheel to so connect the tractor and trailer that the tractor cannot be safely driven or the engagement of the fifth wheel with the king pin lock merely results in the trailer being pushed rearwardly so that the trailer cannot be picked up. In either case, the attempted theft is effectively thwarted.

We prefer that a lock in accordance with our invention consist of a lock plate the maximum thickness of which is substantially equal to the length of the king pin and which has a vertical slot, of the size and shape of the king pin, extending radially into its center so that the lock plate may be connected to the king pin by positioning it to slide thereon. We provide a locking member complemental in section to the slot so that it may be inserted therein to be slidably connected to the locking plate. The inner end of the locking member and the inner extremity of the slot complement each other in establishing, on assembly, a king pin fitting recess. The lock includes any suitable lock by which the locking member may be positively connected to the plate to prevent its withdrawal.

In the accompanying drawings, we have shown a preferred embodiment of our invention from which its several novel features and advantages will be readily apparent.

In the drawings:

Fig. 1 is a perspective view of the king pin, the locking plate to be slid thereon, and the locking member to be slidably inserted into the locking plate when mounted on the king pin.

Figs. 2 and 3 are plan and end views respectively of the locking plate.

Figs. 4 and 5 are plan and end views respectively of the locking member.

Fig. 6 shows the details of the means for interlocking the locking plate and member.

Figure 7:
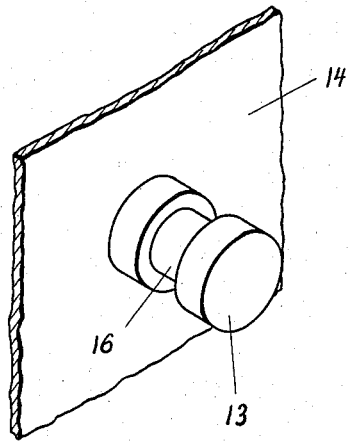
Fig. 7 is a view showing the upper fifth wheel plate.
Figure 8:
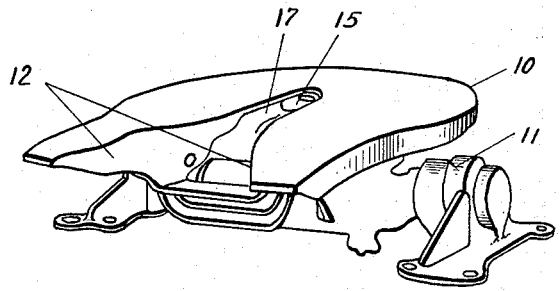
Fig. 8 is a view showing a conventional fifth wheel.

In Fig. 8, we have indicated at 10 a conventional fifth wheel pivotally supported in mounting brackets 11 on the tractor. The fifth wheel 10 has king pin guide jaws 12 adapted to receive the king pin 13 which extends downwardly from the upper fifth wheel plate 14 so that as the tractor is backed under the trailer, the king pin 13 will be positively guided into the extremity of the centrally disposed slot 15 in the fifth wheel. The king pin 13 has an annular groove 16 which receives the lock 17 by which the seated king pin is positively held in place to pivotally interconnect the upper fifth wheel plate 14 and the fifth wheel 10 with the upper fifth wheel plate 14 supported thereon.

In our invention, we provide a lock plate 18 having a flat and substantially circular face 19 adapted to be disposed towards the upper fifth wheel plate 14. Preferably, the plate is in the form of a rounded body, the maximum thickness of which is substantially equal to the length of the king pin 13. We form the lock plate 18 with a vertical slot 20 extending radially inwardly to the center of the plate 18. Adjacent its upper and lower extremities, the slot 20 is of a width equal to the maximum diameter of the king pin 13 and this establishes an intermediate rib 21 defining a slot equal to the diameter of the king pin 13 in the zone of its groove 16 so that by positioning the plate 18 so that the king pin 13 may enter the slot, it may be slid therealong and supported by the king pin 13 with its face substantially flush with the upper fifth wheel plate 14.

We provide a locking member 22 complemental in section to the slot 20 so that it may be inserted therein and slidably connected to the locking plate 18. At its inner end 23, the locking member 22 is formed so that it complements the inner extremity 24 of the slot 20 to establish a recess snugly fitting the king pin 13. The locking member 22 has on opposite sides rib receiving grooves 25 and at its inner end an arcuate projection 26 in alinement with the arcuate portion of the rib 21. The locking member 22 is shaped to complement the face 19 and body of the locking plate 18.

Our locking member 22 has suitable locking means generally indicated at 27. While such locking means may be of any type, we have shown it as comprising a cylinder lock 28 having an eccentric pin 29 engaging in the slot-shaped hole 30 in the lock bar 31 slidable in the slot 32 in one side of the locking member 22. The body of the lock 28 is held against rotation as by a set screw 33 and receives the key 34 by which the pin 29 is actuated. In its locked position, the bar 31 extends into the recess 35 in the locking plate 18 in the zone of its rib 21 and in its unlocked position, the bar 31 is withdrawn therefrom to permit the withdrawal of the locking member 22 from the locking plate 18 and the removal of the locking plate 18 from the king pin 13.

In accordance with our invention, we are thus able to provide simple and rugged locks for the king pin of the upper fifth wheel plate. Such locks are easy to install and may be quickly removed lawfully, but until removed, make it impossible for the tractor and trailer to be operatively connected. While the shape of the lock may be varied as desired so long as it sufficiently covers the king pin to prevent its proper engagement with the fifth wheel, we prefer to have its exposed surface rounded to ensure that, no matter in what direction the locking plate is slid onto the king pin or whether the lock turns relative thereto, an operative connection between the tractor and trailer is positively avoided.

What we therefore claim and desire to secure by Letters Patent is:

1. A lock for the king pin of the upper fifth wheel plate of a trailer to prevent its locking engagement within the jaws of the fifth wheel of a tractor, said lock comprising a body having a face to be disposed towards the upper plate and having a maximum thickness substantially equal to the length of said king pin, said body comprising first and second sections including complemental portions which, when said sections are assembled about a king pin, establish a recess opening through said face and of the size and shape of said king pin thereby to lock the body thereon, and means to lock the assembled sections together, the body having a contact surface of such size and shape as to make impossible an operative connection between the tractor and the trailer when the fifth wheel engages the lock body as the tractor is backed under the trailer.

2. The lock of claim 1 in which the recess is located centrally of the body and the body decreases in thickness toward its periphery.

3. The lock of claim 1 in which the body is rounded.

4. A lock for the annularly grooved king pin of the upper fifth wheel plate of a trailer to prevent its locking engagement within the jaws of the fifth wheel of a tractor, said lock comprising a locking plate having a substantially flat and circular surface to be disposed towards said upper fifth wheel plate and a rounded body, the maximum thickness of said plate being through its center and being substantially equal to the length of said king pin, said plate having a vertical slot extending from its periphery radially inwardly to its center, the width of said slot intermediate its upper and lower extremities being equal to the diameter of said pin in the zone of its groove and adjacent said extremities being of a width equal to the diameter of the remainder of said pin so that when the slot is positioned to receive said pin, said locking plate may be slid thereon to be supported by said upper fifth wheel plate, and a locking member complemental in section to said slot so that it may be inserted therein, the inner extremities of said locking member and said slot complementing each other in establishing a pin receiving recess, and the other surfaces of said member being complemental in shape to said plate surface and said body, said locking member including means operable to lock said member to said plate to prevent it from being withdrawn from said slot.

5. The lock of claim 4 in which the body has a recess in the zone of the intermediate part of the slot, the locking means includes a lock bar movable between a position in which it enters the recess and a position in which it is withdrawn therefrom, and means for moving the bar into either of those positions.

6. A lock for the annularly grooved king pin of the upper fifth wheel plate of a trailer to prevent its locking engagement within the jaws of the fifth wheel of a tractor, said lock comprising a locking plate, the maximum thickness of which is substantially equal to the length of said king pin and which is vertically slotted from its edge inwardly to the thickest part, said slot being complemental in size and shape to said king pin so that it may be slid thereon and thereby connected thereto, and a locking member complemental in section to said slot so that it may be inserted therein and thereby connected to said plate, the inner end of said member and the inner extremity of said slot complementing each other in establishing a pin fitting recess, means carried by said locking member to lock it to said plate to prevent its withdrawal therefrom, said lock being of a size and shape to make impossible an operative connection between said tractor and trailer when the fifth wheel engages said lock as the tractor is backed under the trailer.

FRANK H. GRINNELL.
CARL A. SEARS.